United States Patent [19]
Huck

[11] Patent Number: 5,746,258
[45] Date of Patent: May 5, 1998

[54] APPARATUS FOR FILLING A CONTAINER WITH FREE-FLOWING BULK MATERIAL

[75] Inventor: Hans J. Huck, Houston, Tex.

[73] Assignee: Waeschle Inc., Bloomingdale, Ill.

[21] Appl. No.: 627,054

[22] Filed: Apr. 3, 1996

[51] Int. Cl.⁶ .................. B65B 1/08; B65B 1/16; B65B 3/08; B67C 3/02
[52] U.S. Cl. .................. 141/67; 141/40; 141/50; 141/264; 141/286; 141/301; 141/302
[58] Field of Search .................. 141/302, 264, 141/10, 39, 40, 49, 59, 197, 198, 67, 286, 94, 313-317, 301; 239/533.13, 533.14, 439, 518; 366/101, 107

[56] References Cited

U.S. PATENT DOCUMENTS

| | | | |
|---|---|---|---|
| 3,885,606 | 5/1975 | Krauss | 141/286 |
| 4,135,560 | 1/1979 | Eang et al. | 141/198 |
| 4,756,624 | 7/1988 | Hoppe et al. | 366/101 |
| 4,972,884 | 11/1990 | Souers et al. | 141/286 |
| 5,238,035 | 8/1993 | Poussin et al. | 141/286 |

Primary Examiner—Henry J. Recla
Assistant Examiner—Timothy L. Maust
Attorney, Agent, or Firm—Henry M. Feiereisen

[57] ABSTRACT

Apparatus for discharging bulk material from a silo into a container, includes a tube having an inlet for receiving bulk material from the silo, and a bottom portion formed with two lateral outlets for directing bulk material into the container and exhibiting an open bottom zone. Secured to the bottom portion of the tube is a gate mechanism which is movable between a first position in which the bottom zone is closed and a second position in which the bottom zone is open to allow discharge of bulk material into a central area of the container, thereby effectively loading the container with bulk material and effectively emptying the tube.

9 Claims, 4 Drawing Sheets

APPARATUS FOR FILLING A CONTAINER WITH FREE-FLOWING BULK MATERIAL

BACKGROUND OF THE INVENTION

The present invention refers to an apparatus for filling a container with free-flowing bulk material.

It is generally known to effect a discharge of bulk material from a silo into a container by a filling apparatus of a type having a cylindrical tube which is formed with an inlet for receiving bulk material from the silo and a bottom with lateral outlet ports that open into the container. Secured inside the tube near the bottom is a baffle to direct incoming bulk material evenly toward the outlet ports. The flow of bulk material is supported and accelerated by pressurized gas that is introduced into the tube near the bottom and exits through a suitable vent pipe.

A drawback of a filling apparatus of this type is the inability to fully charge the container because the container is filled with bulk material from the sides to create two piles of bulk material while as a result of the angle of slope the area in the middle of the container beneath the bottom of the tube will effectively be free of bulk material. As soon as the bulk material reaches the lateral outlet ports, the filling process is concluded and the filling apparatus is withdrawn from the container, leaving considerable empty space so that the filling degree of the container is uncertain and unsatisfactory.

SUMMARY OF THE INVENTION

It is an object of the present invention to provide an improved filling apparatus of this type, obviating the aforestated drawbacks.

In particular, it is an object of the present invention to provide an improved filling apparatus by which a container can be charged with bulk material at increased degree of filling.

These objects, and others which will become apparent hereinafter, are attained in accordance with the present invention by providing the bottom of the tube with an open bottom zone, and securing to the bottom a gate mechanism that is movable between a first position in which the bottom zone is closed and a second position in which the bottom zone is opened to allow discharge of bulk material into a central area of the container, thereby effectively loading the container with bulk material and effectively emptying the tube.

Through provision of a gate mechanism that allows a discharge of bulk material in longitudinal direction through the open bottom zone, the central area between the two piles of bulk material that form in the container by inflowing bulk material through the lateral outlet ports is also filled with bulk material. Thus, the filling degree is significantly improved in comparison to conventional filling systems, and reaches nearly 100%.

Preferably, the gate mechanism is formed by a double-flap assembly which is secured to the bottom of the tube, and a double-action cylinder-piston unit which is controlled by a control unit for moving the flap assembly between the first and second positions. The control unit opens the flaps in response to a pressure signal received from a pressure gauge that measures the pressure of the gas inside a conduit leading to the tube. When the signal outputted by the pressure gauge is above a predetermined level as a result of bulk material reaching and eventually blocking off the outlet ports during filling of the container so that the gas pressure increases, the flap assembly is swung open and the flow of bulk material from the silo to the filling apparatus is cut off through actuation of a suitable slide valve.

BRIEF DESCRIPTION OF THE DRAWING

The above and other objects, features and advantages of the present invention will now be described in more detail with reference to the accompanying drawing in which.

DETAILED DESCRIPTION OF PREFERRED EMBODIMENTS

Figure 1:
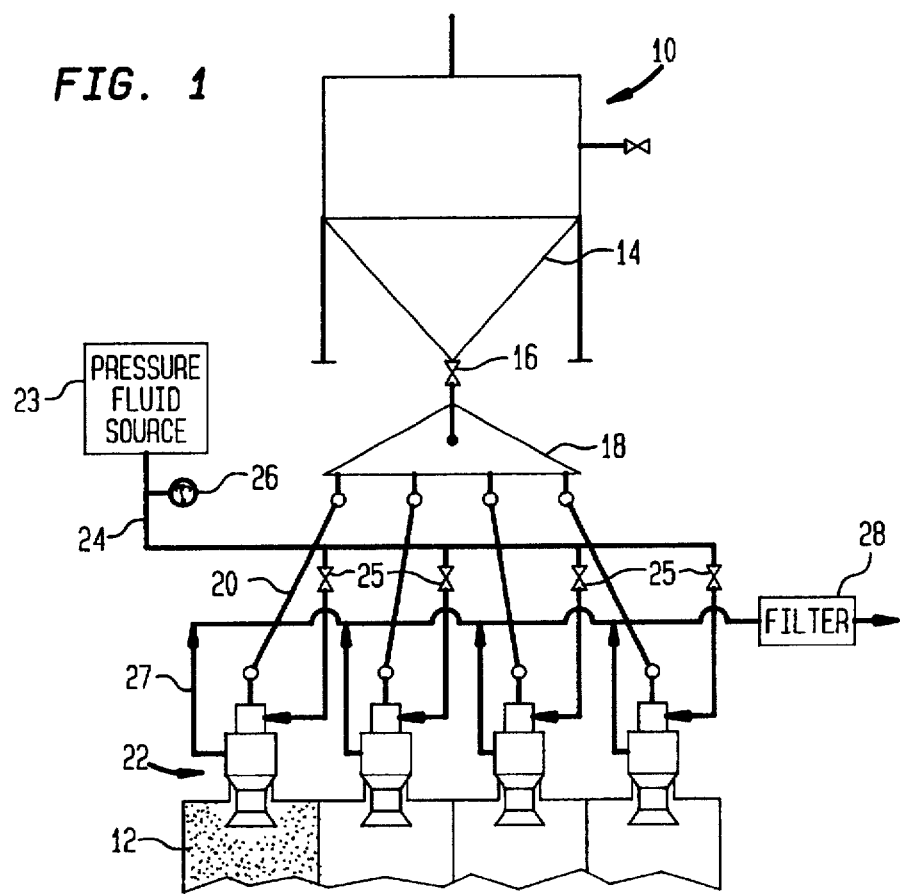
FIG. 1 is a general illustration of a discharge arrangement for conveying bulk material from a silo into a container, incorporating a filling apparatus according to the present invention.

Throughout all the Figures, the same or corresponding elements are always indicated by the same reference numerals.

Turning now to the drawing, and in particular to FIG. 1, there is shown a general illustration of a discharge arrangement for conveying bulk material from a silo 10 into a plurality of adjoining containers 12. The silo 10 is formed with a funnel-shaped bottom 14 having an outlet which is controlled by a sliding valve 16. Upon opening of the sliding valve 16, bulk material flows by gravity into a diverter 18 by which incoming bulk material is directed via a selected conduit 20 of e.g. four conduits, into an associated filling apparatus, generally designated by reference numeral 22. Persons skilled in the art will understand that the illustration of four conduits 20 with four associated filling apparatuses 22 is done by way of example and for illustrative purposes only. It is certainly within the scope of the present invention to utilize less or more than four conduits and filling apparatuses. For example, it is certainly within the scope of the present invention to directly connect a filling apparatus 22 according to the present invention to the silo 10 without provision of a diverter 18 if the arrangement requires only filling of a single container 12 with bulk material.

Each filling apparatus 22 is placed into a container 12 for directing the bulk material from the silo 10 into the interior of the container 12, and communicates with a pressure fluid source 23 for admission of a gas, such as compressed air, through conduit 24 for a purpose to be described hereinafter. The flow of gas into the respective container 12 is regulated by a valve 25, with the pressure of gas in the conduit 24 being monitored and measured by a pressure gauge 26. Gas that is separated from bulk material discharged into the container 12 exits through a conduit 27 and is cleared of dust by a filter 28 before release into the atmosphere. In this manner, the filling operation becomes environmentally friendly.

Figure 2:
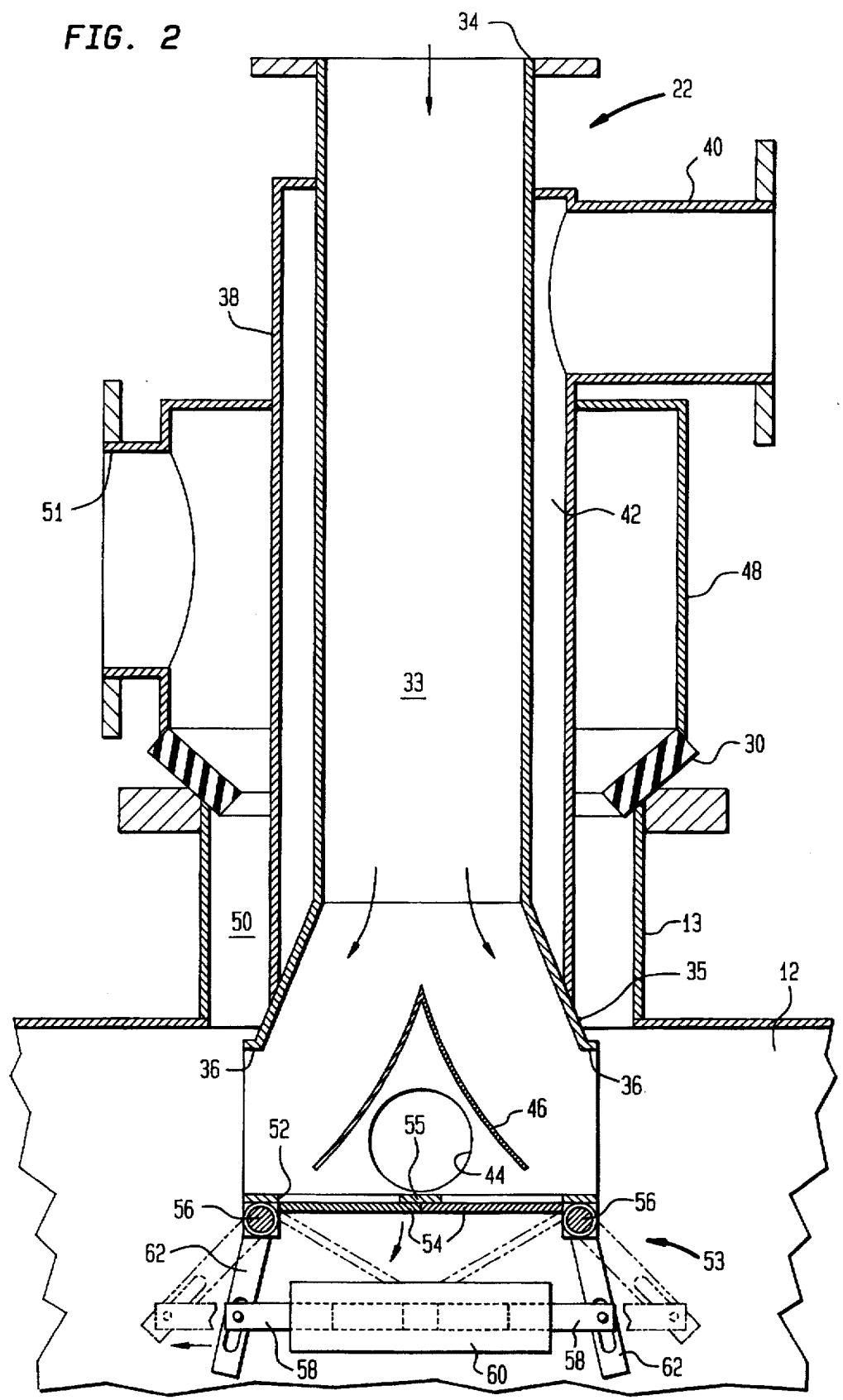
FIG. 2 is a longitudinal section of a filling apparatus according to the present invention.

Turning now to FIG. 2, there is shown a longitudinal section of one embodiment of a filling apparatus 22 according to the present invention. The filling apparatus 22 is guided through the necked flange 13 of the associated container 12 and supported by the flange 13 via an annular gasket 30 to effectively seal the interior of the container 12 from the outside. The filling apparatus 22 includes a central cylindrical tube 32 which defines an interior chamber 33 and has a flanged inlet 34 for attachment to the conduit 20 so that bulk material fed from the diverter 18 via the conduit 20 enters the chamber 33. The tube 32 has a bottom portion 35 which flares outwards to form two lateral discharge outlets 36 in opposite relationship for directing bulk material from the chamber 33 into the container 12.

Figure 3:
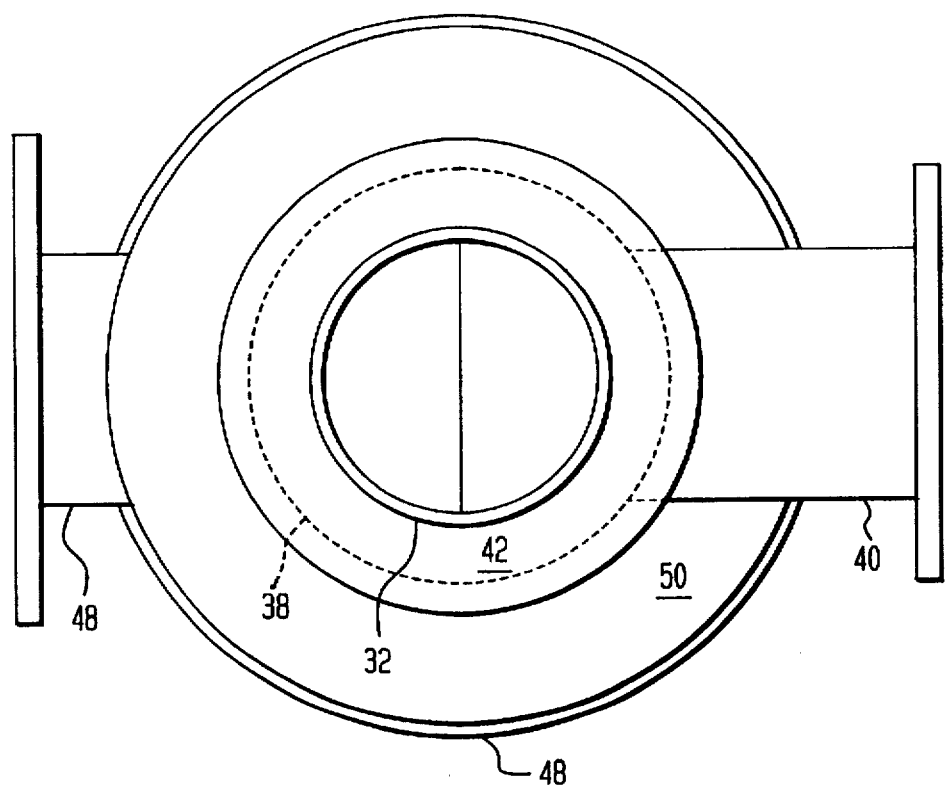
FIG. 3 is a top plan view of the filling apparatus of FIG. 2.

As shown by FIGS. 2 and 3, the tube 32 is surrounded by a pipe 38 which has a flanged inlet port 40 that extends perpendicular from the pipe 38 and is provided for attachment to conduit 24 and admission of a gas, e.g. compressed air. The incoming gas flows from the inlet port 40 downwards along a passageway 42, formed between the outside wall of the tube 32 and the inside wall of the pipe 38, and enters the interior chamber 33 of the tube 32 through an inlet port 44 in the bottom portion 35 of the tube 32 between the discharge outlets 36. A baffle 46 in form of two curved surfaces defining a substantially triangular configuration, is further positioned in the bottom portion 35 of the tube 32, with the peripheral edges of the baffle 46 pointing toward the outlets 36 so that bulk material entering the chamber 33 of the tube 32 through inlet 34 is distributed substantially equally to both discharge outlets 36 for introduction into the container 12 by the baffle 46 and by the gas that enters through inlet port 44.

The pipe 38 is surrounded by an outer shell 48 for discharge of gas separated from the bulk material after bulk material is introduced into the container 12. The gas after being separated from bulk material flows upwardly into the shell 48 via a passageway 50 formed between the outside wall of the pipe 38 and the inside wall of the flange 13 of the container 12. The shell 48 has a flanged outlet port 51 for attachment to the conduit 27 and release of the gas into the atmosphere after passage of the filter 28 for removal of dust.

As shown in FIG. 2, the bottom portion 35 of the tube 32 is formed with an open central bottom zone 52. Secured to the underside of the bottom portion 35 is a gate mechanism, generally designated by reference numeral 53 and including two flaps 54 which are swingably mounted to the tube 32 for rotation about respective pivots axes 56 through actuation of two double-action pneumatic piston/cylinder units, each in form of two pistons 58 reciprocating in a cylinder 60. The pistons 58 are positioned in opposite relationship, with their outer ends being connected to links 62 respectively secured to the pivot axes 56.

Figure 4A:
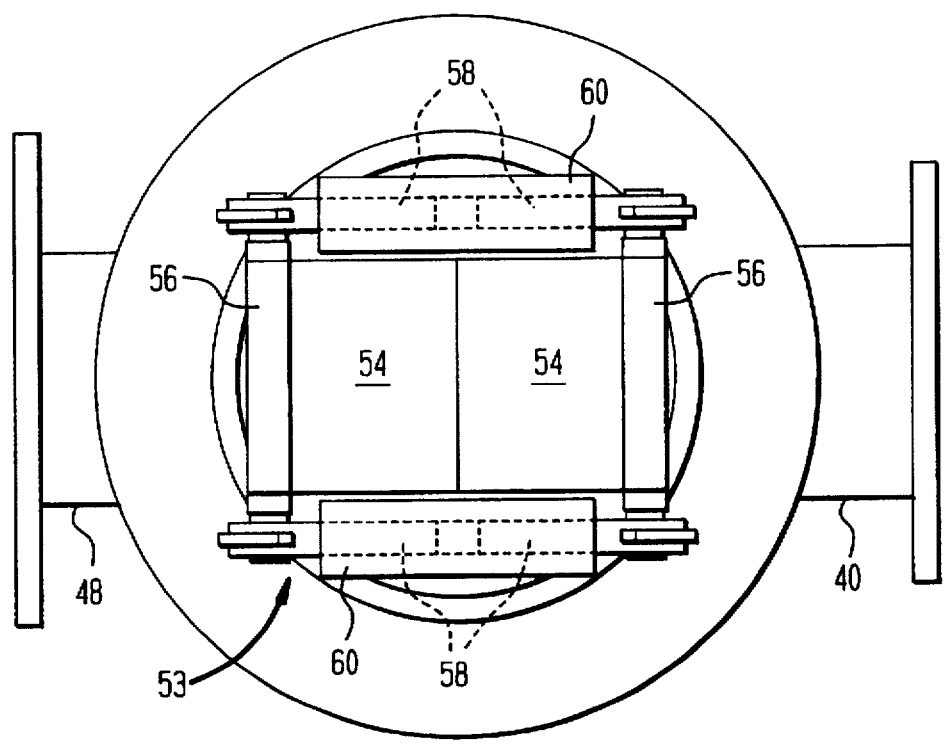
FIG. 4A is a bottom view of the filling apparatus of FIG. 2, showing a gate mechanism in a closed position.
Figure 4B:
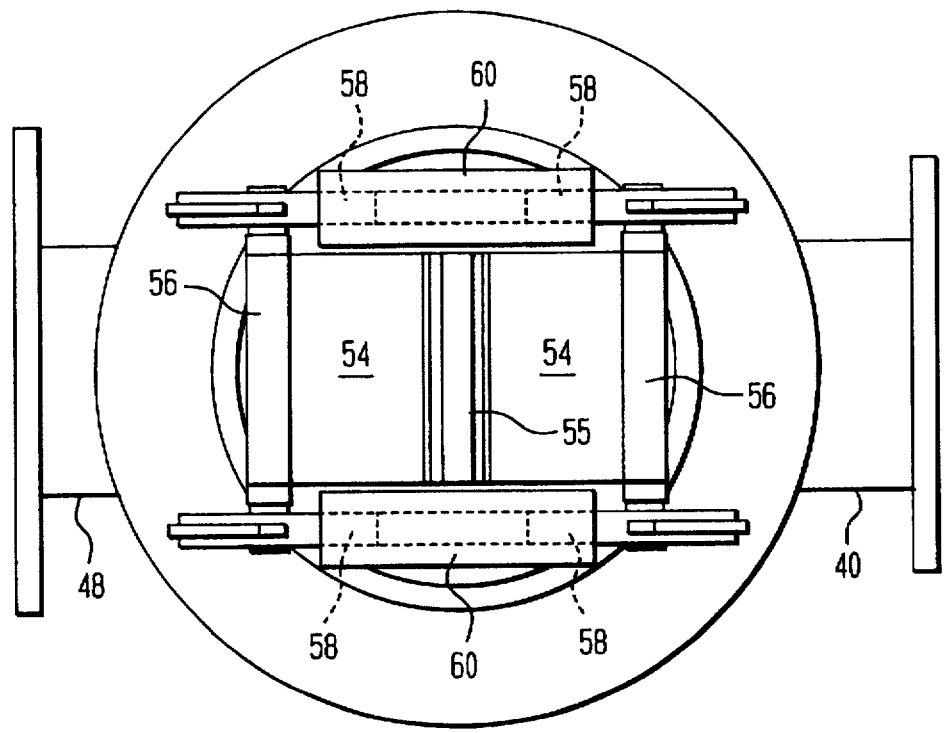
FIG. 4B is a bottom view of the filling apparatus of FIG. 2, showing the gate mechanism in an open position.

As shown in FIGS. 4A, 4B, the gate assembly 53 is moveable in unison by the pneumatic piston/cylinder units between a closed position in which the bottom zone 52 of the tube 32 is closed by the flaps 54, as illustrated in FIG. 2 in continuos lines, and an open position in which the flaps 54 are swung outwards to open the bottom zone 52 of the tube 32, thereby allowing bulk material to be introduced into the container 12 through the bottom zone 52, as indicated in FIG. 2 in phantom lines. The flaps 54 swing out at an acute angle so as to point with their extreme edges toward the central area beneath the tube 32. A bridge 55 is secured in the bottom zone 52 to effectively seal off the gap between opposing ends of the flaps 54 and to form a stop that prevent the flaps 54 from moving upwards into the bottom portion 35.

Figure 5:
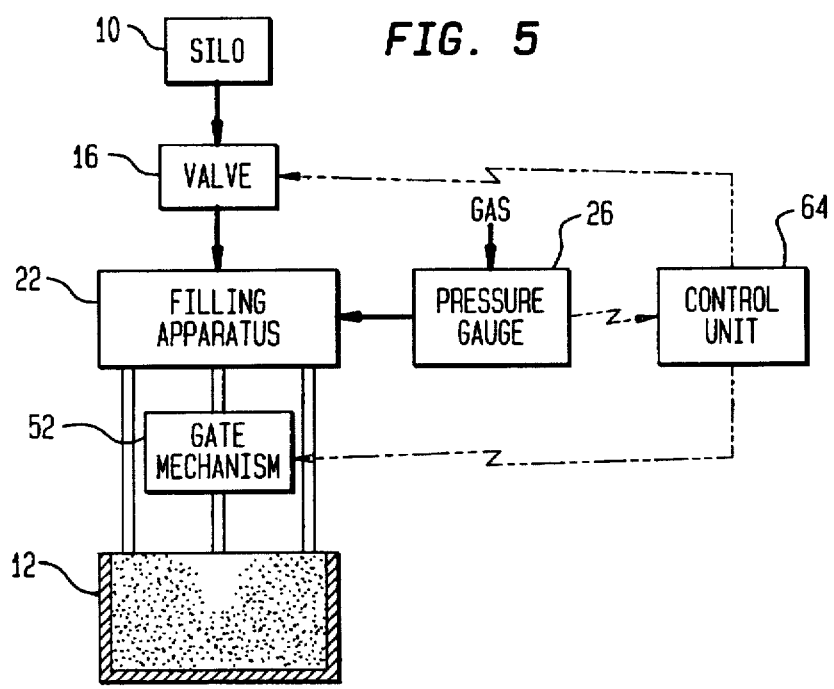
FIG. 5 is a schematic block diagram showing an overview of interrelating components of the discharge arrangement.

The operation is as follows: After placement of the filling apparatus 22 in the container 12, slide valve 16 is opened to allow bulk material to flow from the silo 10 via diverter 18 into the chamber 33 of the tube 32. At the same time, the pertaining valve 25 is opened to allow gas to enter the chamber 33 through inlet port 44. Thus, bulk material entering the chamber 33 is forced by gravity and injected gas to flow downwards and is deflected by baffle 46 equally to the discharge outlets 36 into the container 12. As the container 12 is filled with bulk material through the outlets 36, two piles will form so that the outlets 36 are eventually blocked off by bulk material while a zone beneath the bottom portion 35 of the tube 32 remains substantially free of bulk material. This situation is schematically indicated in FIG. 5 which shows a schematic block diagram of the discharge arrangement. Thus, as bulk material is now prevented from exiting through the outlets 36, the gas pressure monitored by the pressure gauge 26 in conduit 24 increases, and a signal commensurate with the gas pressure is inputted into a control unit 64. When the gas pressure reaches a predetermined level, the control unit 64 closes the slide valve 16 so that a discharge of bulk material from the silo 10 is cut off, and actuates the pneumatic piston/cylinder units to automatically open the gate mechanism 53 by swinging the flaps 54 outwardly as shown in FIG. 2 in phantom lines and FIG. 4B. Thus, bulk material accumulating in the chamber 33 of the tube 32 can be discharged from the container 12 into the empty zone between the two bulk material piles, thereby substantially fully charging the container 12 with bulk material while at the same time emptying the tube 32. Subsequently, the filling apparatus 22 is lifted upwards and removed from the container 12, with the gate mechanism 53 being closed again.

While the invention has been illustrated and described as embodied in a apparatus for filling a container with free-flowing bulk material, it is not intended to be limited to the details shown since various modifications and structural changes may be made without departing in any way from the spirit of the present invention.

What is claimed as new and desired to be protected by Letters Patent is set forth in the appended claims:

I claim:

1. Apparatus for discharging bulk material from a silo into a container, comprising:

a tube having an inlet means for receiving bulk material from a silo and a bottom portion formed with lateral outlet means and a central bottom zone for directing bulk material into a container adapted to hold said bulk material;

a gate mechanism secured to the bottom portion of the tube and movable between a first position in which the bulk material is prevented from being discharged through the central bottom zone and a second position in which the bulk material is allowed to discharge through the central bottom zone into a central area of the container, thereby effectively loading the container with bulk material and effectively emptying the tube; and control means operatively connected to the gate mechanism for moving the gate mechanism between the first and second positions.

2. The apparatus of claim 1 wherein the gate mechanism includes a double-flap assembly secured to the bottom portion of the tube, and a double-action cylinder-piston unit operatively connected to the control means for moving the flap assembly between the first and second positions.

3. The apparatus of claim 2 wherein the gate mechanism includes a bridge secured in the bottom zone above the flap assembly to prevent escape of bulk material when the flap assembly is in the first position and to prevent a deflection of the flap assembly into the bottom portion.

4. The apparatus of claim 1, and further comprising flow accelerating means entering the tube in the proximity of the outlet means for forcing bulk material to the outlet means.

5. The apparatus of claim 4 wherein the tube is formed with an inlet port in proximity of the outlet means, said flow accelerating means including a pressure fluid source for supplying a pressure fluid through the inlet port into the tube.

6. The apparatus of claim 5 wherein the control means includes a pressure gauge for monitoring a pressure of the pressure fluid entering the tube and forming a signal commensurate with the detected pressure, and a control unit receiving the signal outputted by the pressure gauge and operating the gate mechanism to move into the second position when the detected pressure is above a predetermined level.

7. The apparatus of claim 6, and further comprising a valve for regulating a flow of bulk material from the silo, said control unit actuating the valve to cut off a discharge of bulk material from the silo when the detected pressure is above the predetermined level.

8. The apparatus of claim 1 wherein the outlet means includes two outlet ports laterally formed in the bottom portion in opposition to each other.

9. The apparatus of claim 8 wherein the tube accommodates a baffle assembly positioned in the area of the bottom portion for effecting an even distribution of bulk material into the container through the two outlet ports.

* * * * *